(12) United States Patent
Fematt

(10) Patent No.: US 6,604,053 B2
(45) Date of Patent: Aug. 5, 2003

(54) METHOD FOR MEASURING FLOW RATE OF A CONTINUOUS FLUID FLOW

(75) Inventor: Rafael Antonio Fematt, Coahuila (MX)

(73) Assignee: Global Tech Systems, Inc., Rio Rancho, NM (US)

( * ) Notice: Subject to any disclaimer, the term of this patent is extended or adjusted under 35 U.S.C. 154(b) by 191 days.

(21) Appl. No.: 09/782,852

(22) Filed: Feb. 13, 2001

(65) Prior Publication Data

US 2002/0156589 A1 Oct. 24, 2002

(51) Int. Cl.[7] ............................. G01F 1/00; G06F 19/00
(52) U.S. Cl. ................................ 702/45; 50/55; 50/100
(58) Field of Search ............................. 702/45, 50, 55, 702/94, 97, 100, 156, 158; 73/861.09–861.15; 119/14.08, 14.09, 14.1, 14.11, 14.12, 14.15

(56) References Cited

U.S. PATENT DOCUMENTS

| | | | |
|---|---|---|---|
| 2,898,549 A | 8/1959 | Miller | 324/30 |
| 3,242,729 A | 3/1966 | Keller | 73/194 |
| 3,476,085 A | 11/1969 | Noorlander | 119/14.36 |
| 3,547,080 A | 12/1970 | Russell | 119/14.14 |
| 3,783,837 A | 1/1974 | Olander | 119/14.08 |
| 3,989,009 A | 11/1976 | Robar | 119/14.08 |
| 4,015,471 A | 4/1977 | Marsh | 73/194 |
| 4,074,572 A * | 2/1978 | Bullis et al. | 73/861.09 |
| 4,112,758 A | 9/1978 | Heidecker | 73/218 |
| 4,292,926 A | 10/1981 | Tilman | 119/14.02 |
| 4,364,269 A | 12/1982 | Kennerly | 73/223 |
| 4,433,577 A | 2/1984 | Khurgin et al. | 73/290 |
| 4,516,530 A | 5/1985 | Reisgies et al. | 119/14.08 |
| 4,530,465 A | 7/1985 | Gauchet et al. | 239/127 |
| 4,572,104 A | 2/1986 | Rubino | 119/14.02 |
| 4,574,736 A | 3/1986 | Tanaka et al. | 119/14.08 |
| 4,593,649 A * | 6/1986 | Britten | 119/14.08 |
| 4,605,040 A | 8/1986 | Meermeller | 137/489 |
| 4,616,215 A | 10/1986 | Maddalena | 340/626 |
| 4,756,274 A | 7/1988 | Rubino | 119/14.08 |
| 4,797,666 A | 1/1989 | Baxter et al. | 340/606 |
| 4,922,855 A | 5/1990 | Tomizawa et al. | 119/14.15 |
| 4,974,448 A | 12/1990 | Icking | 73/304 |
| 5,046,510 A | 9/1991 | Ams et al. | 128/771 |
| 5,094,112 A | 3/1992 | Hoefelmayr et al. | 73/861.04 |

(List continued on next page.)

FOREIGN PATENT DOCUMENTS

| | | | |
|---|---|---|---|
| EP | 0426266 | 5/1991 | B67D/1/12 |
| EP | 0509288 | 10/1992 | G01F/1/72 |
| GB | 2124877 | 2/1984 | A01J/7/00 |

OTHER PUBLICATIONS

Pp. 235 through 284, Chapter 7, *Basic Mechanics and Testing of Milking Systems*, G. A. Mein, Machine Milking and Lactation, Editors: A.J. Bramley, F.H. Dodd, G. A. Mein & J.A. Bramley, Insight Books, 1992 (the "Bramley et al Reference").

*Primary Examiner*—Bryan Bui
(74) *Attorney, Agent, or Firm*—Daniel J. Meaney, Jr.

(57) ABSTRACT

A method for measuring flow rate of a continuous fluid flow is shown. The method comprises the steps of generating a first signal representing a height of the fluid flow having a known cross-sectional area at the first predetermined location and for generating a second signal at a second predetermined location located in a selected direction and at a known distance from the first predetermined location; generating a third signal representing the conductivity of the fluid; receiving the signals and creating a data stream therefrom; calculating an elapsed time for the fluid flow to traverse the known distance; calculating the average conductivity of the fluid; deriving the cross-sectional area of the selected section and compensating the cross-sectional area for variance in conductivity; calculating the volume of fluid flow; and generating an output signal representing the calculated volume of fluid flow.

23 Claims, 9 Drawing Sheets

U.S. PATENT DOCUMENTS

| | | |
|---|---|---|
| 5,116,119 A | 5/1992 | Brayer .......................... 356/28 |
| 5,195,456 A * | 3/1993 | van der Lely et al. .... 119/14.09 |
| 5,212,955 A | 5/1993 | Hogan ............................ 62/73 |
| 5,245,946 A | 9/1993 | Hoefelmayr ............. 119/14.15 |
| 5,375,475 A | 12/1994 | Kiene et al. .............. 73/861.15 |
| D357,877 S | 5/1995 | Johannesson et al. ........ D10/96 |
| 5,421,210 A | 6/1995 | Kobayashi et al. ...... 73/861.12 |
| 5,635,637 A | 6/1997 | Boult et al. .................... 73/223 |
| 5,720,236 A | 2/1998 | Carrano et al. .......... 119/14.46 |
| 5,792,964 A | 8/1998 | van den Berg .......... 73/861.15 |
| 5,877,417 A | 3/1999 | Arvidson et al. ............. 73/215 |
| 5,896,827 A | 4/1999 | Brown .................... 119/14.02 |
| 5,996,529 A | 12/1999 | Sissom et al. ........... 119/14.14 |
| 6,015,387 A | 1/2000 | Schwartz et al. ........... 600/504 |

\* cited by examiner

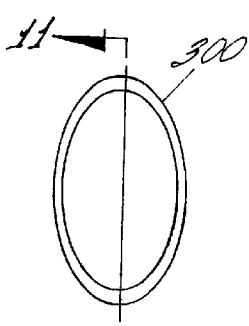
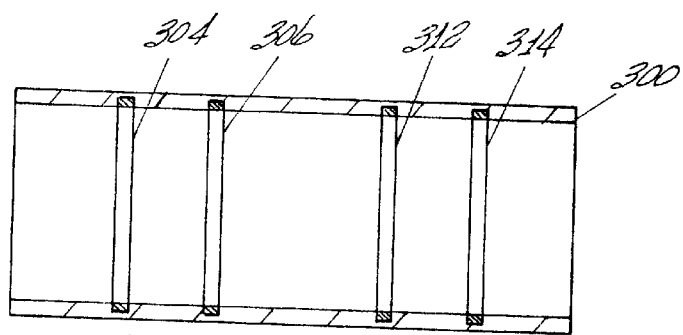
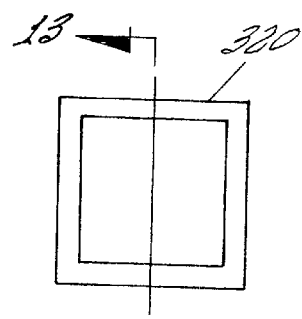
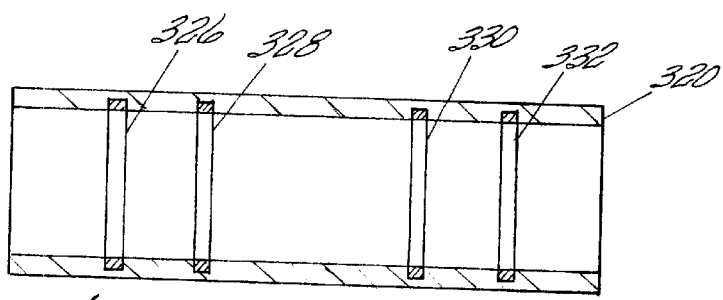
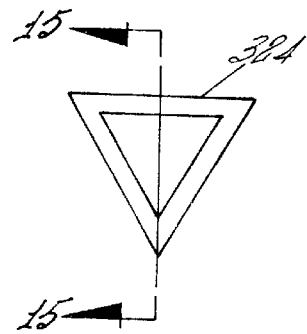
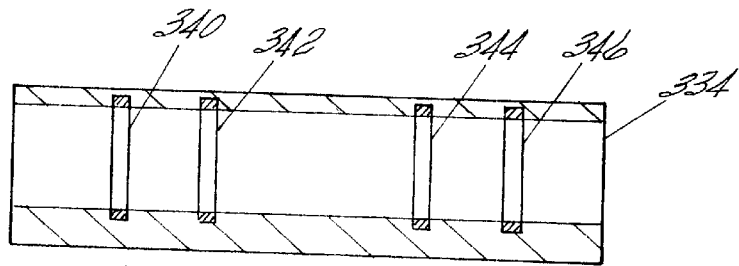

METHOD FOR MEASURING FLOW RATE OF A CONTINUOUS FLUID FLOW

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO A "MICROFICHE APPENDI" (SEE 37 CFR 1.96)

Not Applicable

BACKGROUND OF THE INVENTION

1. Field of the Invention

This invention relates generally to a method for measuring flow rate of a continuous fluid flow, and specifically to a method measuring the flow rate of a substantially continuous milk flow in a milking system. The method comprises the steps of generating a first signal at a first predetermined location representing a height of a selected section of the continuous fluid flow at the first predetermined location and for generating a second signal at a second predetermined location located in a selected direction and known distance representing that the selected section of the continuous fluid flow has traversed from a first predetermined location to a second predetermined location, receiving a first signal and a second signal and creating a data stream therefrom; calculating from the data stream a elapsed time for the selected section of the continuous fluid flow to traverse the known distance; deriving the cross-sectional area of the selected section from the height of the selected section; calculating the volume of fluid flow using a cross-sectional area in a elapsed time and generating an output signal representing the calculated volume of fluid flow.

2. Description of the Prior Art

Milking systems having a vacuum for performing milking of cows are well known in the art. Examples of such milking systems and controls therefor are described in several U.S. Patents, such as for example, U.S. Pat. Nos. 5,896,827; 4,616,215; 4,605,040; 4,572,104; 4,516,530; 3,783,837 and 3,476,085

U.S. Pat. No. 5,996,529 discloses a milk metering and cow identification system which both monitors milk production and identifies each of a plurality of animals being milked. A host computer manages both the flow of data throughout the system and the operation of the milk metering subsystems. The system includes a flow meter comprising a upper housing member and a lower housing member which in use are sealably coupled with a baffle plate via spring clips. The baffle forms a function of reducing the turbulent, pulsatile fluid flow from a milk pump into a manageable fluid stream such that an accurate and reliable determination of milk flow rate can be obtained for a cow coupled to a milker.

U.S. Pat. No. 5,116,119 discloses a method and apparatus for measuring liquid flow which includes directing the liquid to flow through one or more flow channels while exposing the liquid to electromagnetic radiation. The apparatus measures the transparency to electromagnetic radiation of the liquid flowing through the flow channel and measures the momentary attenuation of electromagnetic radiation by liquid flowing through the flow channels to determine the momentary volume of the liquid flowing through the flow channel. This permits the apparatus to make a determination of the momentary flow rate of the liquid flowing through the flow channels.

A reference entitled MACHINE MILKING AND LACTATION by A. J. Bramley, F. H. Dood, G. A. Mein and J. A. Bramley, published by Insight books, Vermon, U.S.A., describes the history, background and state of the art in milking systems and in Chapter 7 entitled *Basic Mechanics and Testing of Milking Systems* by G. A, Mein appearing at Pages 235 through 284, discloses and describes typical milking machine installations (the "Bramley et al. Reference"). The Bramley et al. Reference recognizes that controlling the maximum vacuum drop in the system is desirable because the vacuum drop depends on surface finish of pipes and the overall effective length, including bends and fittings of piping in the milking system and interference from various components such as milk flow meters.

It is known in the art that mastitis can occur if a milk blockage occurs within the inflation of a teat cup cluster causing a back flow of milk into the teat's orifice. Mastitis is an infection of animal body tissue within the mammary system of an animal. Mastitis may be caused by a number of other conditions including irritation to the teats, as is well known to persons skilled in the art. In a milking process, mastitis is generally caused by an introduction of foreign bacteria into the animal's udder, e.g., cow's udder, caused by severe irritation to the teats such that the test orifices cannot be protected from environmental bacteria entering the teats. When mastitis occurs, it is an infection that the animal, e.g., cow's, body must counteract. Thus the animal's body energy is to be used to fight infection rather than produce milk.

A milking machine or milking system generally cause mastitis in two ways.

Mastitis is caused by application of damaging vacuum levels to the cows' teats which create a severe irritation. Since it is difficult to isolate with any degree of certainty at what level of vacuum such irritation occurs, the conservative approach is the least level of vacuum, the better. Each animal, such as a cow, reacts differently to vacuums being applied to teats and each animal tolerates various levels of vacuum differently.

When vacuum is applied to an animal's teats, a lower than atmospheric pressure exists within the animal's udder. When the animal gives milk faster than the milking system can transport the milk away from the teats resulting in a blocking or interfering with the vacuum, a flooding situation occurs resulting in the vacuum being blocked from the teats and udder. The udder is under the operating vacuum level equal to the source before the flooding occurs when flooding occurs, at an atmospheric pressure is bleed into the milk claw.

The vacuum level within the milk claw drops because flooding blocks the source of vacuum from the milk claw. This results in the loss of vacuum to the teats and udder. The udder seeks to return to the ambient atmospheric pressure from the original vacuum level. As a result, air will then fill the vacuum. The filling of the vacuum within the cow's udder causes a foreign air to be introduced into or drawn into the cow's udder. Air does not typically carry a detrimental amount of foreign bacteria, but air under a pressure differential functions as a propellant for bacteria. As such, air itself does not cause significant detriment to the health of the animals, e.g. cow but the air may transport bacteria or other contaminants into the teats thereby contributing to mastitis.

If the vacuum seal breaks and water carrying bacteria is present around the udder, the water outside of or in the vicinity of the inflation and air at atmospheric pressure is drawn or sucked into the teats through the teat orifice.

To overcome such prior art, the inflations and milking systems have been designed to resist breakage of the vacuum seal and the outlet of milk claws and the entire milking system is sized to avoid interruption of the vacuum level. One such system is disclosed in U.S. Pat. No. 5,896,827.

Typically, animals, especially cows, are giving more milk at faster milk flow rates. The sizes and design of the state-of-the-art entire milking system are generally inadequate to handle the volume of milk without some degree of, and often severe, flooding. Also, known milk flow meter contribute to the flooding problems as discussed hereinbefore.

Flooding continually causes reverse pressure differentials and collapse of vacuum. The milk fluid, in effect, causes the average vacuum level within the claw, liners and teat end to be much lower than the desired vacuum level due to continual flooding which interrupts the vacuum and causes undesired pressure differences on the teats.

Introduction of known milk flow meters into vacuum controlled milking systems contribute to interruption of the vacuum in such system for the following reasons.

Prior art milk flow meters do not have a cross-sectional area sufficiently large to pass a continuous milk flow without occluding thereby contributing to flooding and interruption of the vacuum.

A milking system including a milk quantity meter is disclosed in U.S. Pat. No. 5,792,964. In one embodiment of a milk quantity meter disclosed in U.S. Pat. No. 5,792,964, the milk quantity meter is located between a teat cup and a buffer vessel, such as a milk glass, to measure a pulsating milk stream from an individual teat which is obtained pulsationwise and depending on the pulsation frequency at which the milking takes place thereby measuring the quantity of milk obtained from separate udder quarters of the animal.

In U.S. Pat. No. 5,792,964, the milk quantity meter measures the milk flow by integrating the pulses of milk in the fully occluded conduit between the teat cup and milk vessel. The milk quantity meter includes three electrically conductive elements, two of which measure the resistivity of the milk filling the conduit and a third electrode measures the conductivity of the milk. The pulsed milk flow is determined by the area of the conduit filled by the milk and the time required for a milk pulse, which fills the entire conduit, to travel between the two electrodes.

In a second embodiment of a milk quantity meter disclosed in U.S. Pat. No. 5,792,964, the milk quantity meter is located in the pipeline between the buffer vessel, such as a milk glass, and a milk tank. The buffer vessel is used to effectuate a separation between the air and milk. The total quantity of milk can be determined accurately by means of only one quantity meter by discharging the milk from the buffer vessel to the milk tank in one single pulsation wherein the quantity meter is obviously fully occluded by the milk filling the meter due the maximum flow arising from a single pulsation of milk.

Apparatus for use in monitoring milk flow to control removal of teat cups from an animal at the termination of a milking cycle is disclosed in UK Patent Application 2 124 877 A. The monitoring apparatus is located between a cluster having teat cups and a flexible milk flow tube. During milking, a slug of milk occupies the entire cross-section of the path and monitoring apparatus. As the end of the milking cycle is reached, the quantity of milk in the path decreases and is monitored by two electrodes which measures the resistance of the milk within the path and generates an output signal which decreases in amplitude as the level of milk in the path decreases. The monitoring device's responsive to a significant fall in amplitude of the output signal to provide a signal which initiates removal of the teat cups mechanically from the teats of the animal.

Flow meters for measuring flow of milk or fluid utilizing measurement of fluid conductivity or specific resistance is known in the art and examples of apparatus are disclosed in U.S. Pat. Nos. 5,245,946; 4,922,855; 3,989,009 and 3,242,729.

It is also known in the art of flow meters to utilize flow-measuring devices to shut off systems such as milking systems upon completion of a milking cycle. Typical apparatus and systems for controlling shut off of equipment including milking systems is disclosed in U.S. Pat. Nos. 5,996,529, 4,756,274 and UK Patent Application 21248772 discussed hereinbefore.

Milk flow meters utilizing metering chambers are well known in the art and typical systems are disclosed in U.S. Pat. Nos. 5,720,236; 4,433,577; 4,112,758 and DES 357,877.

Apparatus for measuring milk flow utilizing elongated measuring chambers are disclosed in U.S. Pat. Nos. 5,116,119, 4,574,736 and 2,898,549.

PRIOR SUMMARY OF THE INVENTION

None of the known state-of-the-art milking systems utilize a milk flow meter having a conduit for transporting in a selected direction assisted by gravity within the conduit a substantially continuous milk flow varying in height up to a maximum height wherein the maximum height is less than the height which would occlude said conduit.

Further, none of the know prior art milk flow meters prevent occluding of the conduit within the meter to prevent flooding and collapsing of vacuum in a vacuum regulated milking system.

Further, none of the known prior art milk flow meters provide for reducing mastitis and managing milk flow rates at high pounds per hour while reducing irritation to the teats milk flow rates.

The present invention overcomes the problems of the prior art milk flow meters by providing a novel and unique milk flow meter for use in a standard milking system or in milking systems having a regulated, stabilized, substantially continuous vacuum level preferably in the milk apparatus, milk claws and milk hose components of the milking system all having a predetermined cross-sectional area.

The preferred embodiment of the milk flow meter of the present invention includes a conduit for transporting in a selected direction assisted by gravity within the conduit a substantially continuous milk flow varying in height up to a maximum height within the conduit wherein the maximum height is less than the height which would occlude the conduit. A first sensor having a predetermined cross-sectional area defining an opening for passing a milk flow therethrough is located at a predetermined location in the conduit. The predetermined cross-sectional area of the first sensor is greater than the cross-sectional area of a milk flow passing therethrough. The first sensor determines the height of a selected section of milk flow at the predetermined location as a function of that portion of the predetermined cross sectional area bridged by the varying height of the selected section of the continuous milk flow at the predetermined location and on the conductivity of milk. A second sensor having a cross sectional area substantially equal to the cross sectional area of the first sensor is spaced within the conduit in a selected direction and a known distance from the first sensor and determines the selected section of the continuous milk flow has traversed the known distance and measures the height of the selected section as a function of that portion of the predetermined cross sectional area bridged by the varying height of the selected section of the continuous milk flow at the known distance and the conductivity of milk.

In its broadest aspect, the present invention can be utilized as a device for measuring the flow rate of a continuous fluid flow and comprises a conduit for transporting in a selected direction within the conduit a continuous fluid flow varying in height up to a maximum height wherein the maximum height is less than the height which would occlude the conduit. A detector is determines at a first predetermined location the height of a selected section of the continuous fluid flow at the first predetermined location and for determining at a second predetermined location in a selected direction and at that a known distance from the first predetermined location that the selected section of the continuous fluid flow has traversed from the first predetermined location to the second predetermined location. A processing device is operatively connected to the detector for deriving the cross-sectional area of the selected section of the continuous fluid flow determined by the height measured by the first detector at the first predetermined location, determining the elapsed time of the selected section of the continuous fluid flow to traverse the known distance and for calculating therefrom the fluid flow of a continuous fluid flow through the conduit.

One advantage of the present invention is that the milk flow meter may include, separate detecting sections which can be used to measure the height of a selected section or a continuous milk flow to calculate the area of milk flow and elapsed time for a selected section to traverse the known distance between detecting sections.

Another advantage of the present invention is that the milk flow meter may include a first detector for measuring the height of a selected section of a substantially continuous milk flow at a first predetermined location and a second detector determined that the selected section has traversed and the elapsed time therefor over a known distance between the first detector and second detector and a processing apparatus derives the cross-sectional area of the selected section and determined the milk flow rate from the derived cross-sections area and elapsed time.

Another advantage of the present invention is that the milking flow meter can be located between a milk claw and pipeline in a milking system having a substantially stable vacuum level.

Another advantage of the present invention is that the prolonged used of the milk flow meter of the preferred embodiment resulted in an improvement of the health of the animal or cow.

Another advantage of the present invention is the use of a milk flow meter of the present invention helps to eliminate mastitis and leads to greater immediate production and production increased throughout the life of the animal or cow.

Another advantage of the present invention is that a milk flow meter for a milking system is provided having a conduit having sidewalls and a minimum internal diameter selected to be in the range of a minimum internal diameter of at least about 0.75 inches for maintaining at peak milk flow rates from a milking apparatus substantially uniform flow of milk therethrough and for concurrently providing a stable continuous vacuum in a vacuum channel between the flow of milk and the interior sidewalls of said conduit in a maximum internal diameter equal to about 1.5 times the minimum internal diameter.

Another advantage of the present invention is that a milk flow meter is disclosed that is adapted to be operatively connected to a milking apparatus withdrawing milk from an animal's teats while applying a controlled vacuum in the range of about 11.5 times of Hg to about 14.0 inches of Hg to the teats enabling the milk to be withdrawn therefrom at various milk flow rates up to a peak flow rate.

BRIEF DESCRIPTION OF THE DRAWINGS

These and other advantages of the invention will be readily apparent when considered in light of the detailed description hereinafter of the preferred embodiment and of the drawings which include the following figures:

FIG. 10 is a pictorial representation of a circular shaped conduit having a first sensor and a second sensor having circular shape;

FIG. 11 is a sectional view of the conduit taken along section lines 11—11 of FIG. 10;

FIG. 12 is a pictorial representation of a substantially square shaped circuit having a first sensor and a second sensor having a substantially square shape;

FIG. 13 is a sectional view of the conduit taken along section lines 13—13 of FIG. 12;

FIG. 14 is a pictorial representation of a substantially triangular shaped conduit having a first sensor and a second sensor having a substantially triangular shape;

FIG. 15 is a sectional view of the conduit taken along section lines 15—15 of FIG. 14;

DETAILED DESCRIPTION OF THE INVENTION

Figure 1:
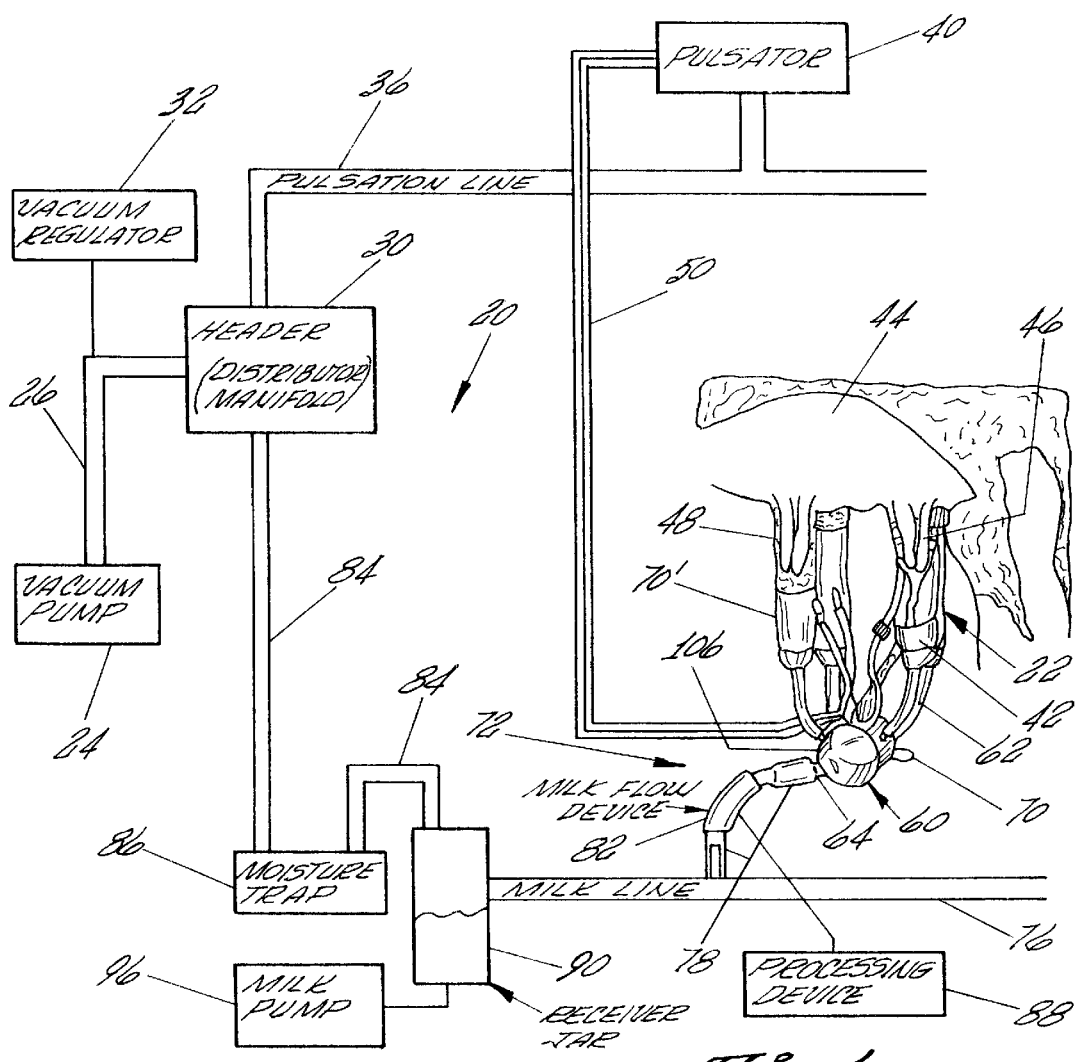
FIG. 1 is a pictorial representation of a milking system having a milk flow device utilizing the teaching of the present invention wherein the milking system includes a milk claw, milk hose, pulsation control devices, milk line and associated components.

Before proceeding with the description of the preferred embodiment, the following background will be helpful in understanding this invention.

BACKGROUND

When a cow enters a milking barn or milking parlor, such as a herring bone style milking parlor, and the milking machine is connected to the animal's body, the body starts to react in preparation for "letting down" of the animal's, e.g. cow's, milk. A natural process takes place wherein the animal produces within the animal's blood stream a chemical called "oxitosin". This chemical works its way down into the udder causing the ovili cells to contract. In essence, contraction of the ovili cells causes a squeezing effect to help push out, expel or withdraw the animal's milk. The period of time the animal produces this oxitosin is limited, and recent research suggests somewhere between 4 minutes and 6 minutes on average.

Once an animal stops producing oxitosin, it becomes difficult, if not impossible, to withdraw or remove any remaining milk from the animal. When milk is left in the udder of the animal, nature "tells" the animal's body that it does not need to produce as much milk. Therefore, when this happens the animal's body will level off milk production and eventually decreases production during that lactation.

When a cow begins lactation, the cow increases its production of milk each day as a natural response to "feed" the animal's growing baby calf. At some time during that lactation, the cow will naturally level off and then begin a decrease in production. This is nature's way of "weaning" off the calf.

With this in mind, one can conclude it is important to withdraw all the milk an animal can produce, otherwise the animal will respond to nature the next day and produce less milk. Realizing that the oxitosin producing process is directly related to milk production, it is important that the milk be withdrawn during the period of time the animal is "naturally" willing to give milk otherwise the milk will be lost.

Since the lactation cycle plays an important role during milking, failure to withdraw all of the milk produced each day will not only lead to a loss of that day's production, but could reduce the full production potential of the animal or cow during the animal's entire lactation life. Therefore, losses of production are compounded if all of the produced milk is not removed during a milking cycle.

The milking system using the teachings of this invention not only captures and relies on the importance of lactation cycles, but is able to milk the cow faster at a substantially stable continuous vacuum level and uses the milk flow meter of the present invention which does not impede or occlude the substantially continuous vacuum during the milking cycle. Faster milking of an animal allows all the milk to be extracted within the oxitosin production period and most importantly when the animal is willing to give milk production and the milk flow device accurately measured milk flow production.

Modern dairies use milk flow meters or milk flow devices to measure milk flow output from each cow enabling the development of databases which can be used for dairy management and other purposes.

MILKING SYSTEMS HAVING MILK FLOW METER

A pictorial drawing of FIG. 1 illustrates a milking system showing generally as 20 which is installed in a milk parlor operation having a plurality of vacuum-operated milking machines shown generally as 22 in individual stalls. A typical milk parlor barn includes individual stalls for placement of the milking apparatus relative to the cows to be milked.

In FIG. 1, a source of vacuum is provided to the milking system by vacuum pump 24 through a vacuum conduit 26 to a vacuum manifold header 20. A vacuum regulator 32 is operatively connected to the vacuum conduit 26 to control the maximum vacuum that would be applied to the milking system. Typically, the vacuum level in a milking system is in the order of 12 inches of Hg (12" Hg).

The vacuum manifold header 30 is operatively coupled by a pulsation line 36 to a pulsator 40.

The pulsation line 36 is generally a plastic or steel line that carried vacuum, equal to the desired preset vacuum level, to the pulsator 40. Pulsation line 36 must be adequately sized to carry air away from the pulsator without allowing a drop in vacuum (lower than the milking vacuum level).

The pulsator 40 is a device that intermittently draws air through flexible conduit 50 from within the shell (outside the liner) of the inflation 42 and creates a vacuum to "pull" or "open" the inflation 42 away from or releasing the teat of the cow milking the teat open so that the vacuum from the milk claw draws milk down through the teat. This is referred to as a "milk period". Alternatively, atmospheric pressure is applied by the pulsation 40 to the liner to "push" or "close" the inflation 42 against the teat of the cow closing off the teat. This is referred to as a "rest period". The pulsator 40 periodically draws air out of the inflation 42 to create a this cycle of opening and closing of the liner. This creates a situation of milking (teat under vacuum) and rest (teat not under vacuum).

As illustrated in FIG. 1, the vacuum pump 24 removes air from the milking system to create less than atmospheric pressure within the milking system. The vacuum manifold header 30 is essentially a distribution manifold that allows both the milk line 76 and pulsation line 36 to have equal access to the vacuum source, which in this embodiment is a vacuum pump 24 and vacuum regulator 32.

The vacuum regulator 32 is a vacuum level controller which is a device that maintains a predetermined or preset vacuum level within the milking system 20. A typical vacuum pump 24 has capacity to draw vacuum levels lower than the levels desired in the basic milking system 20. The vacuum regulator 32 includes an air inlet to vary or balance the capacity of the vacuum pump 24 or to change the air introduced into the milking process during normal operation. At times when the milking system 20 is intermitting air equal to the vacuum pump 24, the vacuum controller or vacuum regulator 32 will be off (no air inlet). When the milking system is intermitting air less than the capacity of the vacuum pump 24 capacity, the vacuum regulator 32 will open and "make-up" the difference to maintain a constant and predetermined level of vacuum into the milking system 20 equal to the capacity of the vacuum pump 24.

Referring back to FIG. 1, the milking apparatus shown generally as 22 has the inflations 42 which define the teat engaging portion of a teat cup cluster. The milking apparatus 22 is adapted to have the inflations 42 operatively connected or operatively attached with an animal's udder, such as for example a cow's udder 44, having teats 46 to apply a controlled vacuum to the teats 46 to remove milk therefrom. The inflations 42 include a shell and liner 48 which have an "open" and "closed" position depending upon the vacuum pressure applied thereto as described hereinbefore. The vacuum pulsator 40 is operatively connected by a flexible vacuum lines 50 to control the shell and liner 48.

The shells and liners 48, comprise two components. The first component is a liner which is a soft rubber tube that goes around the cow's teat 46 to seal it off from atmospheric pressure to allow the vacuum to draw milk from the cow's udder 44. The other component is a shell which is a rigid device that houses the liner and can seal the outside of the liner from atmospheric pressure. The shells and liners 48 cooperate to selectively or controllably apply vacuum to the cow's udder 44 and teats 46 to withdraw the milk.

A milk claw 60, is operatively connected to the inflations 42 by means of flexible tubing 62, to receive milk from the inflations 42 at various milk flow rates. The milk claw 60 receives and passes the milk under a stabilized continuous vacuum in a vacuum channel at a selected vacuum level and, most importantly, at peak milk flow rates. The milk claw 60 includes an outlet 64 having side walls and preferably has a predetermined cross-sectional area selected to be in the range of: (i) a minimum cross-sectional area for maintaining at all milk flow rates a substantially uniform laminar flow of milk therethrough and for concurrently providing a stabilized continuous vacuum in a vacuum channel between the laminar flow of milk and the interior walls of the outlet 64; and (ii) a maximum cross-sectional area equal to about 1.5 times the minimum cross-sectional area of the outlet 64.

In the preferred embodiment, the milk claw 60 has four (4) inflations 42 since a cow has (4) four teats. The inflations 42, under controlled vacuum pressure from the pulsator 40, extracts milk from the cow's udder 44 as described hereinbefore. The milk claw 60 functions as a manifold device (claw) that brings the milk from four inlets into single outlet.

The milk claw 60 further may optionally include a control orifice 70, which is in the form of a calibrated orifice, for controllably admitting atmospheric pressure to the milk claw 60. Control orifice functions to control the vacuum level within the milk claw outlet 64. Also, the milk claw 60 has a housing 66 that has a central chamber 104 defined by sidewalls 106.

It is desirable to intermit air to the vacuum system at this point in the milk claw 60 as the cow produces fluid milk; it would otherwise be difficult to transport the milk away from the cow without approaching flooding. Therefore, the milk claw 60 may have an air bleed port or control orifice 70 formed therein.

The milk claw outlet 64 is operatively connected by a milk transport conduit, shown generally as 72. The milk transport conduit 70 comprises a milk hose portion 78 and a milk flow meter or milk flow device 82. The milk flow device 82 includes its associated electrical processing system generally shown as processing device 88.

Figure 2:
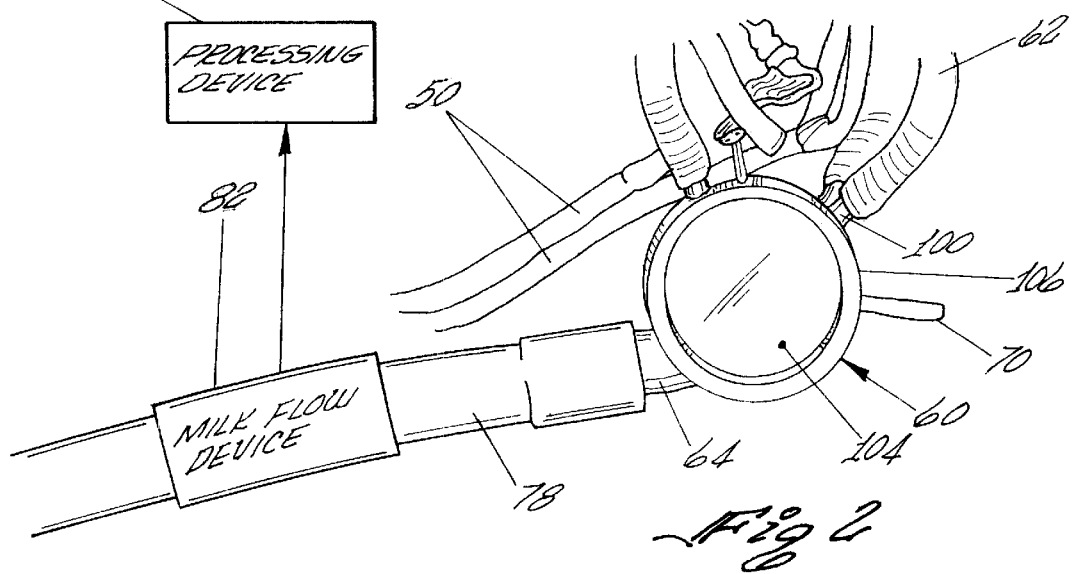
FIG. 2 is a pictorial representation of a milk claw having a milk hose which extends to a milk line having a milk flow device located in the milk hose and wherein a processing device including an integrating system is operatively connected to the milk flow device.

FIG. 2 shows in greater detail that the milk transport conduit 72 includes the semi-flexible milk hose 78 operatively connected to a milk flow device 82. The semi-flexible milk hose 78 carries the substantially continuous milk flow from the milk flow device 82 to the milk line 76 as shown in FIG. 1.

The term "milk transport conduit" is intended to also include any other intermediate in line components, devices, control apparatus or the like (such as, for example, a milk flow measuring devices, device for terminating or shutting off the vacuum at the end of a milking cycle, vacuum sensing devices and the like. In accordance with the teachings of this invention, is desirable and preferable that all such devices, controls and components have a cross-sectional area substantially equal to the predetermined cross-sectional area of the outlet 64. Otherwise, interruption of the vacuum channel may occur caused by flooding and loss or collapse of the vacuum.

Typically, known prior art control or monitoring devices have inlets and outlets of different cross-sectional sizes or have a passageway or channel that has a reduced internal dimensions. Such devices can cause flooding of milk during maximum milk flow rates blocking the vacuum channel causing a collapse of the vacuum. These devices typically contribute to delay times required in a milking system in order to return to the operating vacuum level, generally referred as vacuum recovery. For these reasons, it is anticipated that this invention likewise covers such control or monitoring devices that have a cross-sectional area that is substantially equal to that of the outlet 64 used in the milking system using the teachings of this invention.

In the embodiment illustrated in FIG. 1, the milk transportation conduit is in the form of a semi-flexible clear plastic hose 78 which is operatively connected to an inlet nipple 80 of the milk line 76. In the preferred embodiment, the semi-flexible hose 78 is a plastic or rubber hose connecting the milking claw outlet 64 to the inlet nipple 80 as described above.

The milk line 76, commonly referred to as a milk transfer line, is in the form of a stainless steel line with adequate capacity to carry vacuum to the cow from the vacuum source 26. The vacuum manifold header 30 applies vacuum via a conduit 84 and a moisture trap 86 to a receiving vessel such as a receiving jar 90 which is in the form of an enclosed vessel functioning as a vacuum chamber. The receiving jar 90 is operatively connected to a milk pump 96 to remove the milk collected in the receiving jar 90.

The milk line 76, under a vacuum which is applied thereto through the receiving jar 90, transports the milk away from the cow to the receiving jar 90 where it is accumulated and pumped away by milk pump 96.

It is important for the milk transfer line 76 to have enough capacity to carry milk away from all individual milking apparatus 22 while still leaving adequate capacity to form a vacuum channel for unrestricted, stable, continuous closed vacuum system to the cow's udder 44.

The milk transfer line 76 and receiver jaw 90 must be sized to have enough capacity such that the milk flow will not fill the line, e.g. food the line, which would block the vacuum channel and flow of vacuum to the milking apparatus 22 operatively connected to the cow's udder 44.

In addition, the location of the receiving jar 90 affects the vacuum variation. If the lifting height in 0 inches, the vacuum fluctuations are within a narrow range of fluctuations. If the lifting height is in the order of 12 inches, the vacuum fluctuations are over a wider range of fluctuations.

OPERATING EXAMPLE

In order to explain the operation of the milking system 20 including a milk flow device 82 using the teachings of the present invention, the following operating example is provided.

Typically, in a milking system 20, the preset vacuum level is established at approximately 12 inches Hg (12" Hg). A milking cycle of a cow to be milked using the present invention may be in the order of about 6 minutes. During the milking process, approximately 45 pounds of milk may be withdrawn from the cow. The relationship of pounds per minute for each minute of the milking cycle for the above example is as follows:

TABLE 1

| Minute of Milking Cycle | Pounds of Milk per Minute (lbs/min) | Cumulative Pounds of Milk Withdrawn During Milking Cycle |
|---|---|---|
| Minute 1 | 5 | 5 |
| Minute 2 through Minute 4 | 12 | 36 |
| Minute 5 and Minute 6 | Approximately 2.5 | 45 |

Figure 3:
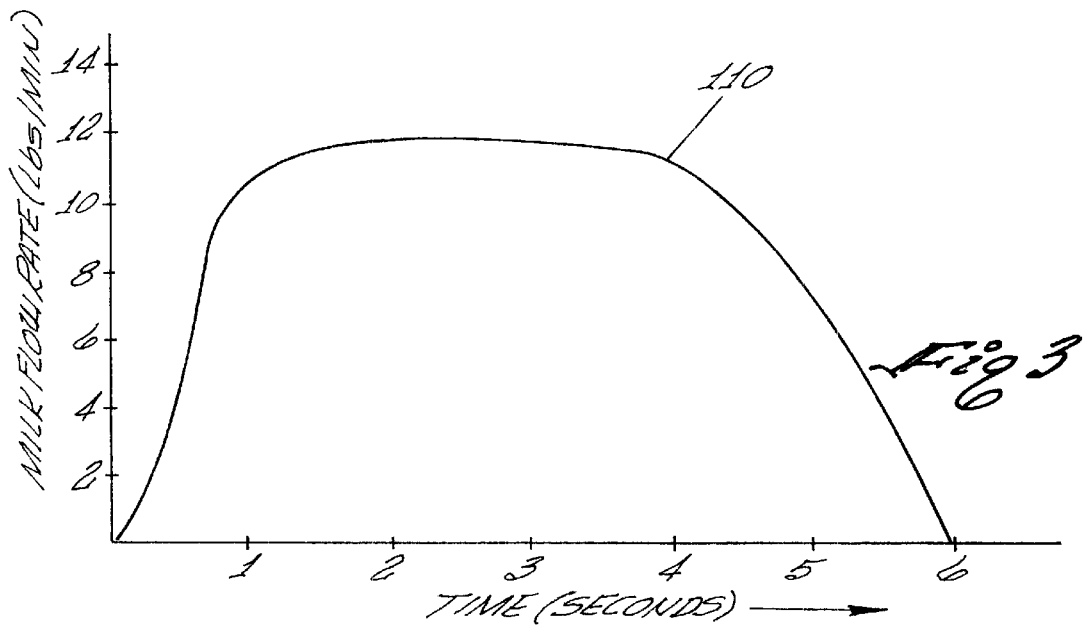
FIG. 3 is a chart plotting the milk flow rate as a function of time during a typical milking cycle of a cow.

Referring now to the chart illustrated in FIG. 3, the chart plots as curve 110 the milk flow rate as function of time during the above described milking cycle of a cow using the data set forth in Table 1 above. Curve 110 shows that at the beginning of the milking cycle that maximum flow rate is reached with a minute or so. However, it takes about two minutes or so at end of the cycle to reduce to a zero flow rate. For purposes of discussion of this example, the milking cycle of 6 minutes will continue to be used. During the milking cycles, a substantially continuous milk flow is present.

Figure 4:
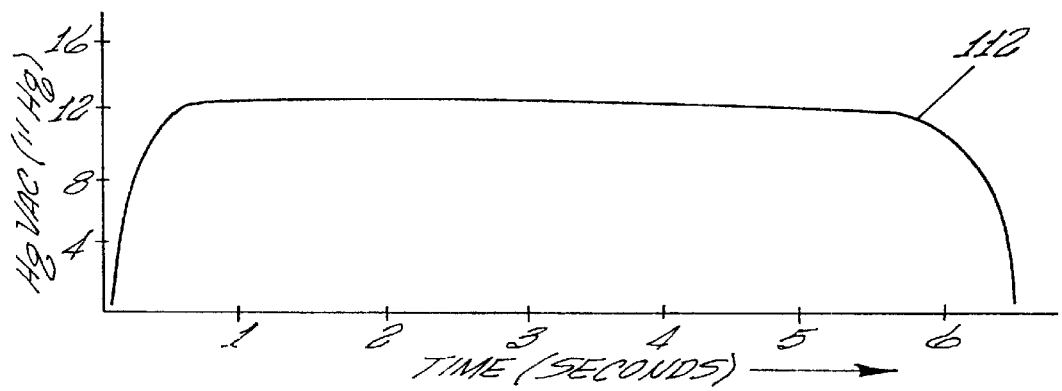
FIG. 4 is a chart plotting vacuum level of the vacuum source as a function of time during normal startup, operation of and shut-down of the vacuum system illustrated as part of FIG. 1.

In the chart illustrated in FIG. 4, the chart plots as curve 112 vacuum level operation established by the vacuum source as a function of time during normal startup operation and shut-down of the vacuum system during a 6 minute milking cycle. As illustrated, by curve 112 in FIG. 4, when the vacuum is turned on, it immediately reaches a preset vacuum level of 12 inches Hg (12" Hg) which is the desired vacuum level and remains at that level until the end of the milking cycle.

Figure 5:
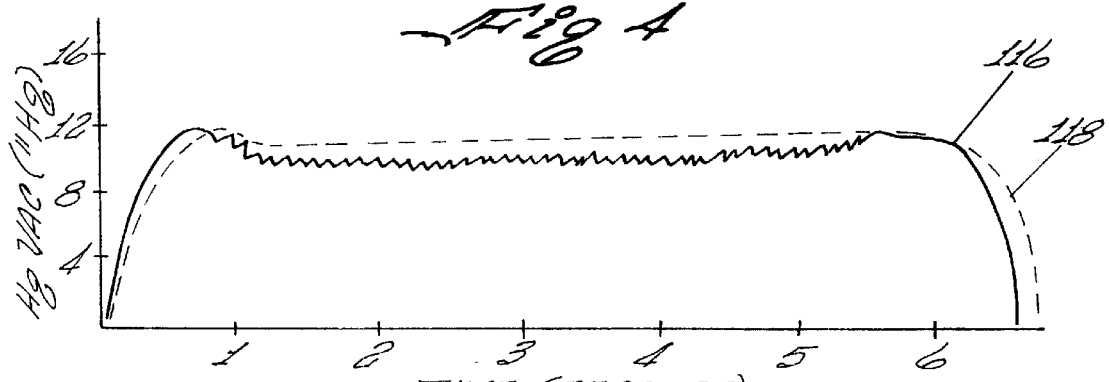
FIG. 5 is a chart plotting vacuum level as a function of time illustrating operation of a milk claw and milking system for two types of vacuum controlled milking system.

The wave form of FIG. 5 illustrates in a solid line 116 that the vacuum level plotted as a function of time, for a typical milking system, e.g., ⅝" milk claw outlet, which is illustrated by curve 116, drops down to approximately 10 inches Hg (10" Hg) of vacuum level with peak-to-peak excursions having amplitudes varying between approximately 0.5 inches Hg (0.5" Hg) and 1.5 inches Hg (1.5" Hg). A decrease from the desired vacuum level of 12 inches Hg (12" Hg) to about 10 inches Hg (10" Hg) occurs during the first minute of the milking cycle as the milk flow rate increases from approximately 5 pounds per minute, at one minute of the cycle, to approximately 12 pounds per minute at Minutes 2 through 4 of the cycle. The peak-to-peak excursions of the vacuum level are caused by the flooding of the milk claw outlet and milk hose which interrupts the vacuum. As the milk flow rate declines to approximately 2.5 pounds per minutes during Minutes 5 and 6, the vacuum level again approaches the preset level of 12 inches Hg (12" Hg) until the end of the milking cycle.

In the wave form of FIG. 5, the wave form plots vacuum level as a function of time in a dashed line 118 when a milk claw 60 having an outlet 64 and other system component have a preselected cross-sectional area within the range of minimum and maximum cross-sectional areas described hereinbefore. As illustrated by curve 118, during the Minute 1 the preset vacuum level of 12 inches Hg (12" Hg) is reached. As the milk flow rate increases and reaches maximum flow during Minutes 2 through 4, the vacuum channel in the outlet 64 and milk hose 78 is not cut off. Thus, a surge of milk at the high milk flow rates will not block the milk claw 60, will not block the milk claw outlet 64 or will not block the milk hose 78. As a result, the vacuum level has less peak-to-peak excursions in amplitude as compared to the peak-to-peak excursion illustrated by curve 116 in FIG. 5. Typically the average vacuum level remains at approximately 11.5 inches Hg (11.5" Hg) or about 0.5 inches Hg (0.5" Hg) fluctuations. However, other variables, such as the lifting height of the milk, the cross-sectional area of the milk claw outlet and the number of curves in the piping system and the smoothness of the interior surfaces all affected the range of vacuum fluctuations.

It is respectfully note that the milk flow device of the present invention can successfully be used in typical milking systems wherein the milk claw outlet and system dimension are not optimized to reduce vacuum fluctuation, e.g., milk claw outlets having a dimension in the order of ⅝".

Of course, the preferred application of the milk flow meter is in a milking system wherein the milk claw outlet and system components including the diameter of the milk flow device have a preselected cross-sectional area within the range of minimum and maximum cross-sectional areas described hereinbefore.

Figure 6:
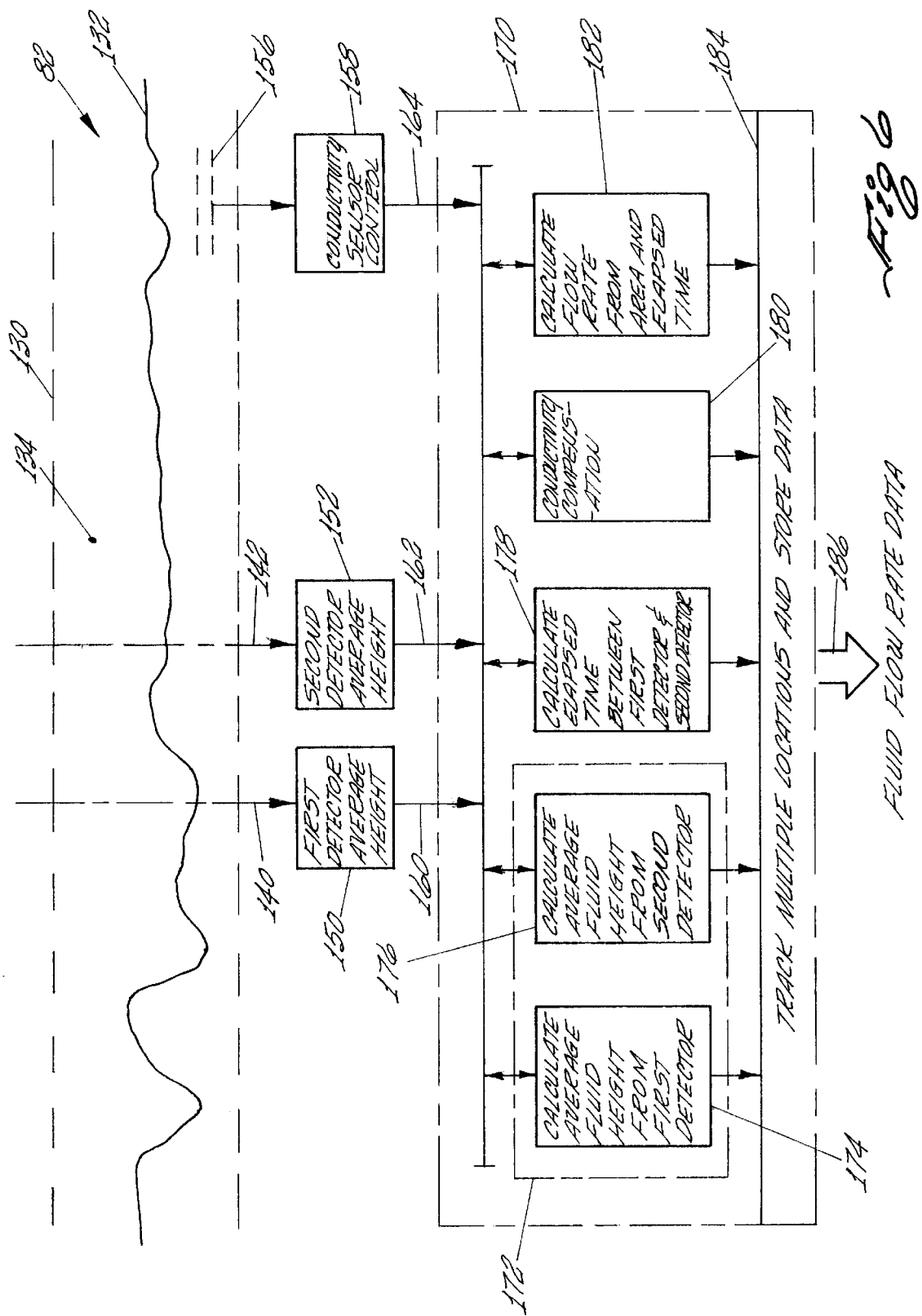
FIG. 6 is a pictorial representation of a milk flow device having a conduit which transports a substantially continuous milk flow varying in height up to a maximum height wherein the maximum height is less than a fluid height which would occlude the conduit and interrupt the vacuum level and which includes details of a detector, a processing device including an integrated system for determining fluid flow data.

In the pictorial representation of a device for measuring the flow rate of a substantially continuous fluid flow, shown in FIG. 6, the preferred embodiment is a milk flow meter 82 having a conduit shown by dashed line 130 which transports in a selected direction aided by gravity a substantially continuous milk flow 132 which varies in height up to a maximum height. The maximum height is less than a fluid height which would occlude the conduit 130 and interrupt the vacuum which is located between the milk flow 132 and conduit 130 and shown as area 134.

A detector shown by dashed box 138 is positioned relative to the conduit 130 for determining the height of a selected section of the substantially continuous fluid flow at a first predetermined location shown by dashed arrow 140. The detector 138 also determines at a second predetermined location shown by dashed arrow 142, which is located in a selected direction in a known distance from the first predetermined location 140, that the selected section of the continuous fluid flow 132 has traverse from the first predetermined location 132 to the second predetermined 142.

For purposes of this invention, the term "section", "selected section" or "selected section of a continuous fluid flow" means a cross-sectional slice, cutting or division taken along a plane substantially normal to the direction of the fluid flow so as to identify a particular differential section having a predetermined thickness to establish the "section", "selected section" or "selected section of the continuous fluid flow". The term "selected section" used herein refers to each of the above terms. The height of a selected section of the continuous fluid flow has a known cross-sectional area at the first predetermined location.

The slicing, cutting or division forming the "selected section" is identified electronically by known electronic sampling technologies and the "selected section" is electronically identified at the first predetermined location 140 by its specific characteristics at the time of sampling and "that selected section" is substantially electronically identified at the second predetermined location 142 by the substantially same electrical characteristics determined by the detector 138 at the first predetermined location 140.

In FIG. 6, the detector 138 may be located anywhere provided it has the capability of detecting the height of the "selected selection" at the first predetermined location 140. Likewise, detector 138 is capable of electronically identifying "that selected section" at the second predetermined location 142. By electronically making such a determination, the elapsed time for the "selected selection" to traverse the known distance from the first predetermined location 140 to the second predetermined location 142 can be precisely determined.

There are several ways known in the art to detect the height of a "selected section" for practicing the invention. In the preferred embodiment, an electrode adapted to measure conductivity of the fluid flow is used which essentially depends upon the resistivity of the fluid. However, it is possible to use other sensors for the detector such as, for example and without limitation, magnetic detectors, pressure detectors, ultrasonic detectors, optical detector, e.g., infrared, laser and the like, capacitive detectors, conductive detectors and resistance measuring detectors.

In using such known detectors as described above, it is desirable that the detector have a lineal or a non-lineal relationship between the detector signal and the fluid height.

It is further envisioned that a magnetic detector can utilize an electrical magnetic measuring device which includes at least one hall effect transducer.

Referring again to FIG. 6, in the preferred embodiment the detector 138 would include a first detector section 150 located at the first predetermined location 140 within the conduit and a second detector section 152 located within the conduit at the second predetermined location 142. The detectors 150 and 152 may include electronics for determining average heights of a plurality of "selected sections".

As an example, when a milk flow 132 passes through the conduit 130, the detector 150 and 152 would sample at a sampling rate of 800 samples per second. The 800 samples per second can be plotted in a wave form that represents how the milk flow 132 is transported within the conduit 130. A typically set of wave forms are discussed in greater detail herein below in connection with FIG. 21.

A conductivity sensor 158 is located within the conduit 156 and is positioned to be in substantially continual contact with the substantially continuous fluid flow 130 for measuring the conductivity of the continuous fluid flow 132.

The output from the conductivity sensor 156 is applied to a conductivity sensor control 158.

The first detector 150 has an output signal shown by arrow 160, a second detector 152 has an output signal represented by 162 and conductivity sensor control has an output signal represented by arrow 164. The output signals appearing on 160, 162 and 164 are applied to a processing device shown generally as dashed box 170.

The processing device 170 includes an integrating system shown by dashed box 172 which includes circuitry 174 for calculating average fluid height from the first detector in response to the output 160. The integrating system 172 includes a circuit 176 for calculating average fluid height from the second detector based on output signals received from output 162.

In addition, the processing device 170 includes circuitry 178 which is responsive to signals 160 and 162 to determine or calculate elapse time for a "selected section" to traverse the known distance between the first detector and second detector. A conductivity compensation device 180 is responsive to the output signals on output 164 from the conductivity sensor control 158 to develop signals required to compensate calculation as a result of change in conductivity of the continuous fluid flow such as the milk flow 132.

The processing device 170 includes circuitry 182 for deriving or calculating flow rate from the area determined from the average fluid height and from the elapsed time for a "selected section" to traverse from the first detector 140 to the second detector 142 over the known distance.

The processing device 170 is capable of tracking multiple locations and storage data as represented by lead 184. The output from the processing device is fluid flow rate data which can be displayed and/or stored in any desired format such as for example, total weight, weight per minute, flow rate per minute, total gallons of milk or the like, all as represented by arrow 186.

Figure 7:
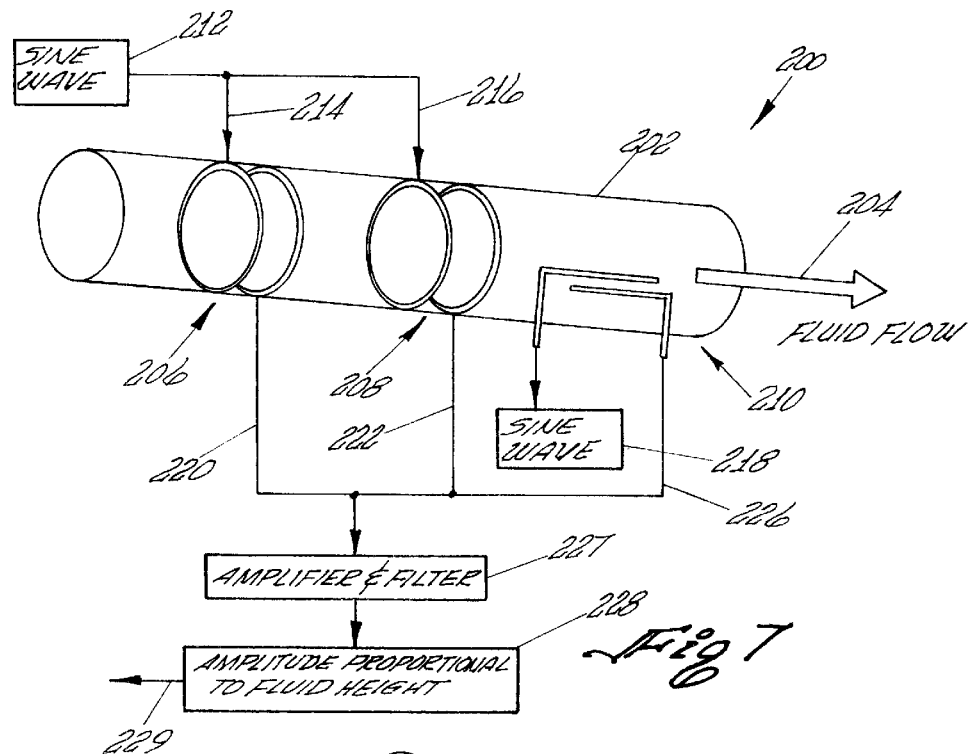
FIG. 7 is a pictorial representation of a milk flow device having a conduit positioned to have gravity assist milk flow therethrough and having a first sensor, a second sensor, a conductivity sensor and representations of various components forming a processing device.

FIG. 7 is a pictorial representation of a milk flow meter 200 having a conduit 202 positioned at a slope so as to have gravity assist milk flow 204 therethrough. The milk flow meter 200 includes a first sensor 206, a second sensor 208, and a conductivity sensor 210.

In order to have the conduit 202 positioned at a slope so as to have gravity assist milk flow 204 therethrough, the conduit 202 can not be positioned in a substantially vertical or in a substantially horizontal position. The conduit 202 is to be placed at a slope having a selected angle. In its broadest application, the selected slope relative to a horizontal plane can vary between about 5 degrees to about 85 degrees.

In a narrower aspect, the selected slope relative to a horizontal plane can vary between about 10 degrees to about 80 degrees.

In most applications, the selected slope relative to the horizontal plane can vary between about 20 degrees to about 60 degrees.

In a preferred embodiment, a selected slope relative to the horizontal plane can vary between about 25 degrees to about 35 degrees with 35 degrees being preferred.

In the milk flow meter of FIG. 7 the electronic sampling of the fluid flow is obtained by use of a sine wave generator which is operatively connected by leads 214 and 216 to the rings of the first sensor 206 and second sensor 208, respectively.

In addition, a sign wave generator 218 is operatively connected to the conductivity sensor 210 to provide an electronic sampling of the output of the conductivity sensor 210.

The output from first sensor 206 appears on lead 220, the output from the second sensor 208 appears on lead 222 and the output from the conductivity sensor 220 appears on lead 226. The output signals appearing on leads 220, 222 and 226 are applied to an amplifier and filter circuitry 227 and the lead from the amplifier and filter is applied to a circuit 228 which generates an output signal having an amplitude proportional to fluid height. The output from circuit 228 appears on lead 229 is applied to a processing device such as, for example, processing device 170 of FIG. 6.

Figure 8:
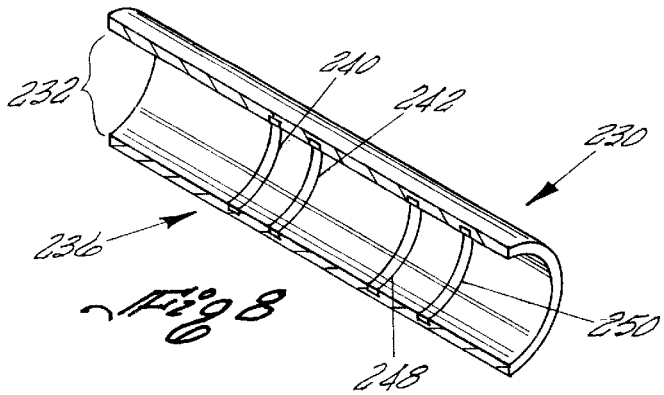
FIG. 8 is a pictorial representation in a perspective section of a conduit having an internal diameter and a first sensor and second sensor having a diameter substantially equal to the internal diameter of the conduit.
Figure 9:
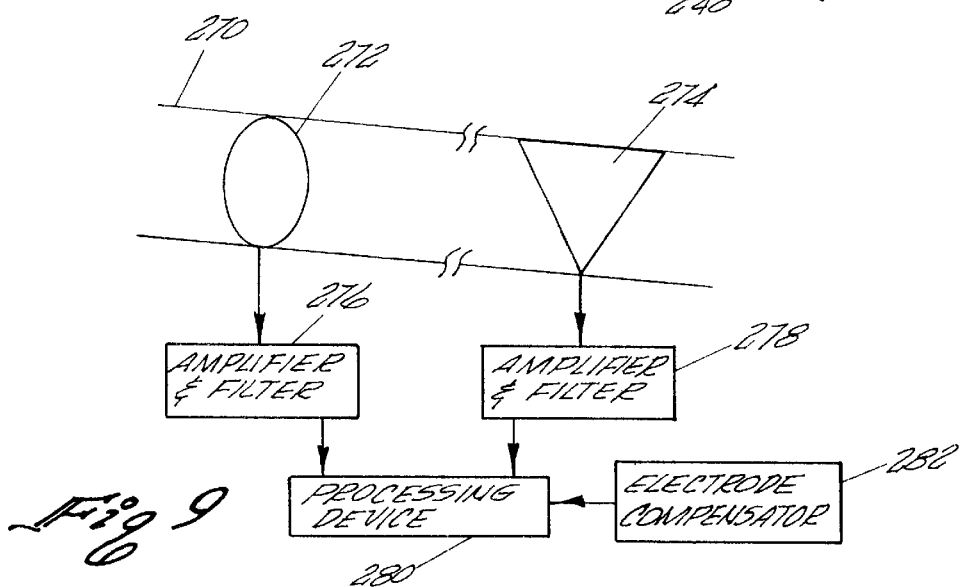
FIG. 9 is a pictorial representation of a conduit enclosing a first sensor having a geometric shape which is generally circular shaped and a second sensor having a different geometric shape; e.g., a triangular shaped and processing device components including a integrating system and electrode compensator to compensate for any differences due to the geometric shapes oft he electrodes.

The perspective section of a conduit 230 as shown in FIG. 8 has an internal diameter 232. The conduit 230 encloses a first sensor 236 which is in the form of electrode having a pair of spaced rings 240 and 242. In addition, the conduit encloses a second sensor 246 which is in the form of an electrode having a pair of spaced rings 246 and 248. Each of the rings 240, 242, 246 and 248 have a diameter substantially equal to the internal diameter 232 of the conduit 230;

FIG. 9 is a pictorial representation of a conduit 270 enclosing a first sensor 272 having a geometric shape which is generally circular shaped and a second sensor 274 having a different geometric shape, e.g., an inverted triangular shape.

Output from the first sensor 272 is applied to an amplifier and filter 276. The output from the second sensor 274 is likewise applied to an amplifier and filter 278.

The outputs from each of the amplifier and filter 276 and 278 are applied as an input to a processing device 280. In the event that it is necessary to compensate for characteristics for each of the electrodes to obtain the desired height of a "selected section" and for determination of elapsed time, an electrode compensator 282 may be utilized to compensate for any variances due to the difference in the geometric shape of the electrodes.

Generally, if the electrodes of each of the first sensor and second sensor are of the same geometric shape and size, it is usually not necessary to utilize an electrode compensator 282.

The milk flow meter may use sensors having electrodes of different geometric structures. If the different electrodes structures result in any variances in operating characteristics, e.g., the height of the "selected section" varies due to the electrode structure, the processing device includes an electrode compensator to compensate for any differences in determining height or other characteristics of the "selected section" or elapsed time determination due to the geometric shapes of the electrodes.

FIGS. 10 through 18 depict various shapes for the conduit in a milk flow device or milk flow meter for processing this invention.

In FIGS. 10 and 11, a circular shaped conduit 300 is shown having a first sensor 302 in the form of a pair of spaced rings 304 and 306 having circular shape. Likewise, a second sensor 308 is in the form of a pair of spaced rings 312 and 314 having a circular shape. The diameter of the rings 304, 306, 312 and 314 are substantially equal to the internal diameter of the conduit 300. The rings 304, 306, 312 and 314 may be discrete electrode elements located in grooves formed on the inner surface of the conduit 300 or could be deposited electrodes.

In FIGS. 12 and 13, a substantially square shaped conduit 320 is shown having a first sensor 322 in the form of a pair of spaced rings 326 and 328 having a substantially square shape. Further, a second sensor 324 is the form of a pair of spaced rings 330 and 332 having a substantially square shape. The diameter of the rings 326, 328, 330 and 332 are substantially equal to the diameter of the conduit 320. The rings 326, 328, 330 and 332 may be discrete electrode elements located in grooves formed in the inner surface of conduit 320 or could be deposited electrodes.

In FIGS. 14 and 15, a substantially triangular shaped conduit 334 is shown having a first sensor 336 in the form of a pair of spaced rings 340 and 342 having a substantially triangular shape. Further a second sensor 338 is the form of a pair of spaced rings 344 and 346 having a substantially triangular shape. The diameter of the rings 340, 342, 344 and 346 are substantially equal to the diameter of the conduit 334. The rings 340, 342, 344 and 346 may be discrete electrode elements located in grooves formed in the inner surface of conduit 334 or could be deposited electrodes.

Figure 16:
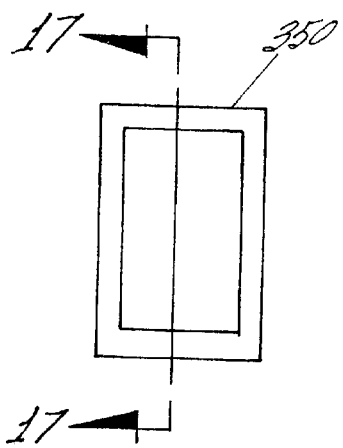
FIG. 16 is a pictorial representation of a substantially rectangular shaped conduit having a first sensor and a second sensor having a substantially shaped rectangular.
Figure 17:
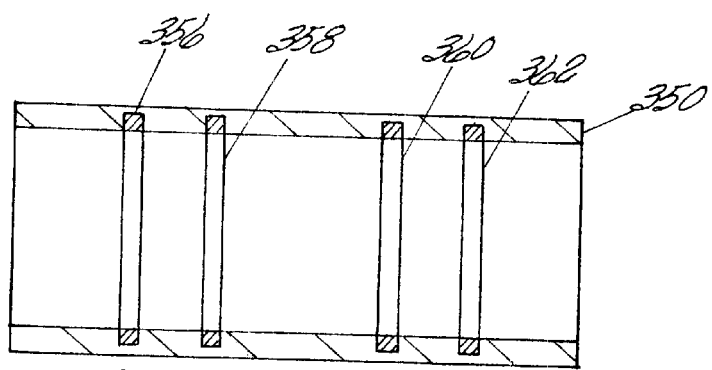
FIG. 17 is a sectional view of the conduit taken along section lines 17—17 of FIG. 16.

In FIGS. 16 and 17, a substantially rectangular shaped conduit 350 is shown having a first sensor 352 in the form of a pair of spaced rings 356 and 358 having a substantially rectangular shape. Further a second sensor 354 is the form of a pair of spaced rings 360 and 362 having a substantially rectangular shape. The diameter of the rings 356, 358, 360 and 362 are substantially equal to the diameter of the conduit 350. The rings 356, 358, 360 and 362 may be discrete electrode elements located in grooves formed in the inner surface of conduit 350 or could be deposited electrodes.

Figure 18:
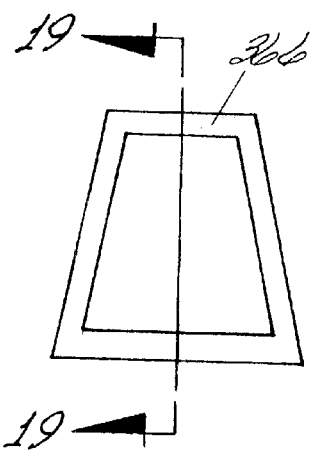
FIG. 18 is a pictorial representation of a substantially trapezoidal shaped conduit having a first sensor and a second sensor having a substantially trapezoidal shape.
Figure 19:
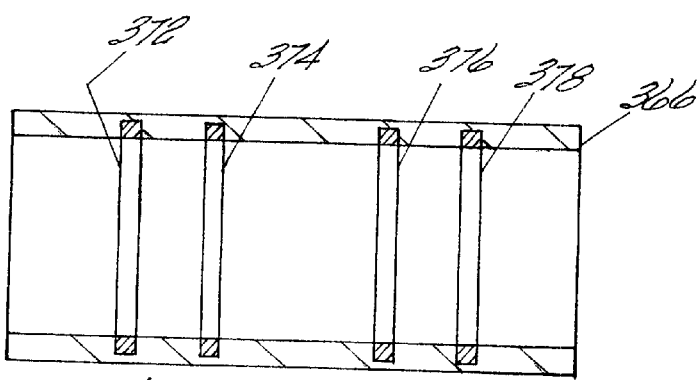
FIG. 19 is a sectional view of the conduit taken along section lines 19—19 of FIG. 18.

In FIGS. 18 and 19, a substantially trapezoidal shaped conduit 366 is shown having a first sensor 368 in the form of a pair of spaced rings 372 and 374 having a substantially trapezoidal shape. Further a second sensor 370 is the form of a pair of spaced rings 376 and 378 having a substantially trapezoidal shape. The diameter of the rings 372, 374, 376 and 378 are substantially equal to the diameter of the conduit 360. The rings 372, 374, 376 and 378 may be discrete electrode elements located in grooves formed in the inner surface of conduit 350 or could be deposited electrodes.

Figures 20A, 20B, 20C:
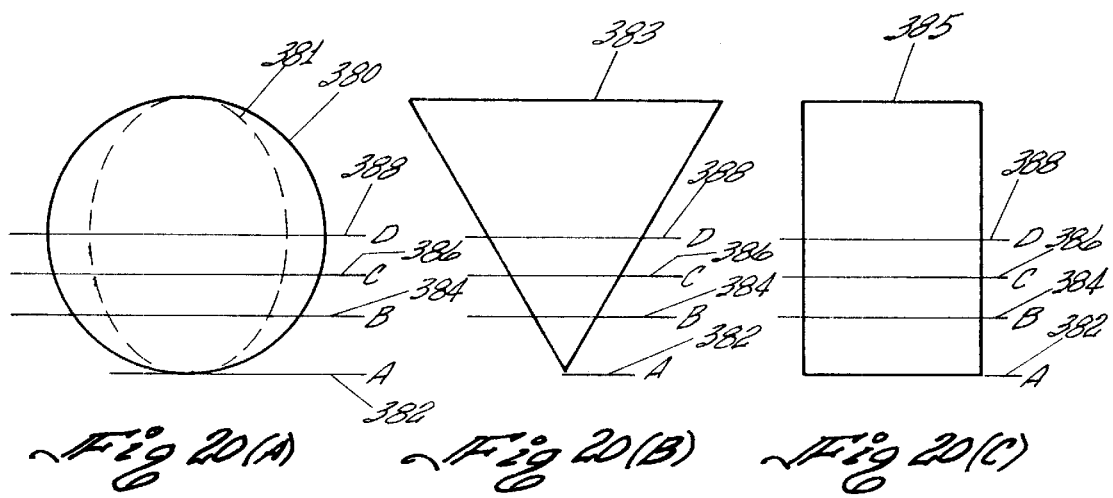
FIG. 20(A) is a diagrammatic representation of a circular electrode and an oval shaped electrode shown by the dashed line used as a sensor having reference lines A, B, C and D.
FIG. 20(B) is a diagrammatic representation of an inverted triangular electrode used as a sensor having reference lines A, B, C and D.
FIG. 20(C) is a diagrammatic representation of a rectangular electrode used as a sensor having reference lines A, B, C and D.

FIGS. 20(A), 20(B) and 20(C) are diagrammatically representations of various electrode shapes which can be used for practicing this invention.

FIG. 20(A) represents a circular shaped electrode shown by solid line 380 which is the preferred embodiment for practicing the invention. Also, an oval shaped electrode is shown by dashed line 381 and an oval shaped electrode can likewise be used for practicing this invention. Reference line A, identified as line 382; reference line B, identified as line 384, reference line C identified as line 386 and reference line D as line 388 are superimposed on to the circular electrode 380 and oval electrode 381. It is noted that the contact area between reference lines A and B, lines 382 and 384, verses the contact area between reference lines B and C, lines 384 and 386 is less. Further, the contact area between reference line C and D, lines 386 and 388 is greater than the contact areas between reference lines A and B, lines 382 and 384, and reference lines B and C, lines 384 and 386. Generally, it is more difficult to detect slight changes between reference lines A and B verses reference lines B and C. Therefore, the contact area between reference line A, 382 and reference line D, line 388 provides, the largest contact area enabling the processing device to detect slight changes using a circular shape electrode. Circular shape electrode does not provide linearity.

The electrode shapes of FIGS. 20(B) and 20(C) include an inverted triangular shaped electrode 383 and a substantially rectangular shape electrode 385 positioned with its longer side 390 extending substantially vertically to the fluid flow within the conduit.

In FIGS. 20(B) and 20(C) the same reference lines A, B, C and D are superimposed onto the electrodes 383 and 385. Utilizing one of the geometrical shapes of FIGS. 20(B) and 20(C) shows that the contact areas between the reference lines A, B, C and D provide for a more lineal resolution. In applications wherein there is slow continuous fluid flow, the electrode shapes of FIGS. 20(B) and 20(C) would provide better resolution for measuring low flow rates, as well as for measuring high flow rates.

It is readily apparent that the height of a fluid flow can be easily determined by use of reference lines. Since the maximum height of the fluid flow is less than the actual height of the conduit enclosing electrodes 380, 381, 383 or 385, the cross-sectional area of an infinitesimal differential slice of fluid flow comprising the substantially continuous fluid flow can be easily calculated based on the detected average height and known geometric shape of the electrode.

Figure 21:
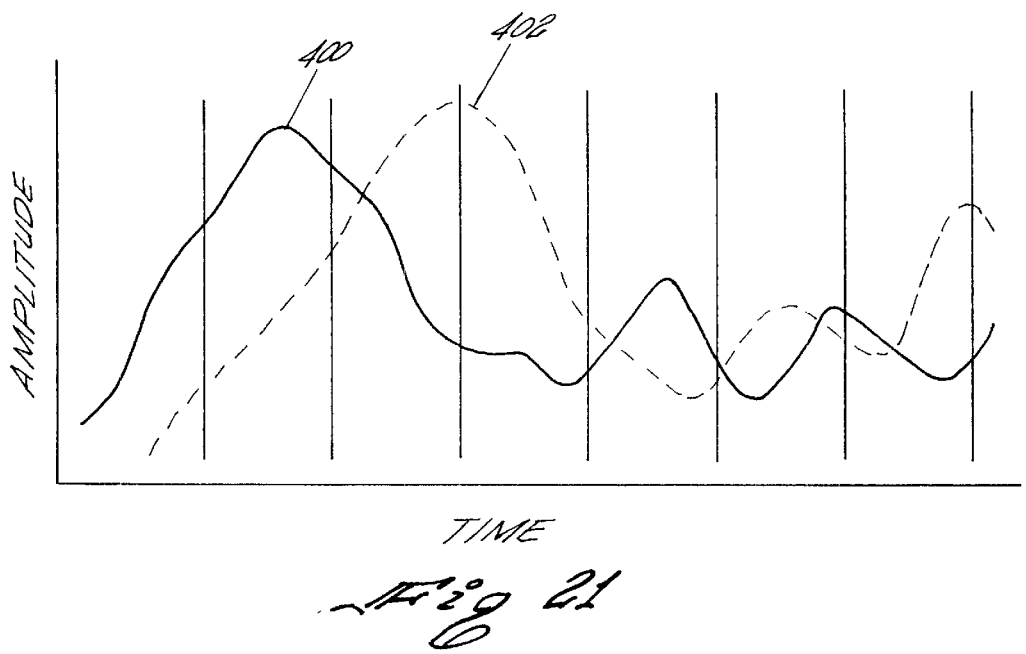
FIG. 21 is a wave form showing the amplitudes of electrical signals plotted as a function of time for electrical signal generated by a first sensor for a selected section of a substantially continuous milk flow and by a second sensor for that selected section of a substantially continuous milk flow which has traversed a known distance from the first sensor to the second sensor wherein the wave form show the time delay or elapsed time required for the selected section of a substantially continuous milk flow to pass from the first sensor to the second sensor.

Referring now to FIG. 21, FIG. 21 is a wave form showing amplitude of the output signal from a first sensor, e.g., a sensor 206 of FIG. 7 and amplitude of the output signal from a second center, e.g., sensor 208 of FIG. 7 plotted as a function of time. As discussed in connection with the description of FIG. 7, the first sensor and second sensor are sampled at the sampling rate of 800 samples per second. In order to detect the fluid flow rate in the milk flow meter two signals are used which are depicted as solid line 400 and dashed line 402. The solid line 400 corresponds to the signal of the first pair of rings, e.g., the pair of spaced, concentrically aliened circular shaped electrodes forming the first electrode 206 in FIG. 7. The dashed line 402 corresponds to the signal of the second pair of rings, e.g., the pair of spaced, concentrically aliened circular shaped electrodes forming the first electrode 208 in FIG. 7.

In the preferred embodiment, the electrode rings are physically identifiable and the electrical signal produced from the electrode rings are very similar with the principal difference being in the phase of the signals.

In order to develop the elapsed time required for a "selected section" to traverse from a first predetermined location to a second predetermined location the following algorithm is used.

| Step | Process |
| --- | --- |
| (1) | Subtract point to point of wave form 400 signal from wave form 402 signal, 800 sampling points, |
| (2) | Add all of the differences and save the value as an error for the error step |
| (3) | Translate wave form 402 signal one point to the left and repeat steps (1) and (2) |
| (4) | Redo this step until wave form 402 has moved at least 300 sampling points (maximum delay anticipated) |
| (5) | Check all errors, it being noted that the errors will be minimum when both wave forms are in phase. |
| (6) | The delay or elapsed time is represented for the number of points that the wave form signal 402 was shifted to obtain the minimum error. |
| (7) | In the event it is required to shift wave form 402 up and down to find the minimum error the error developed in step (1) can be used to determine the amount of shifting required to compensate for the wave form signals not being identical in amplitude. |

Figure 22:
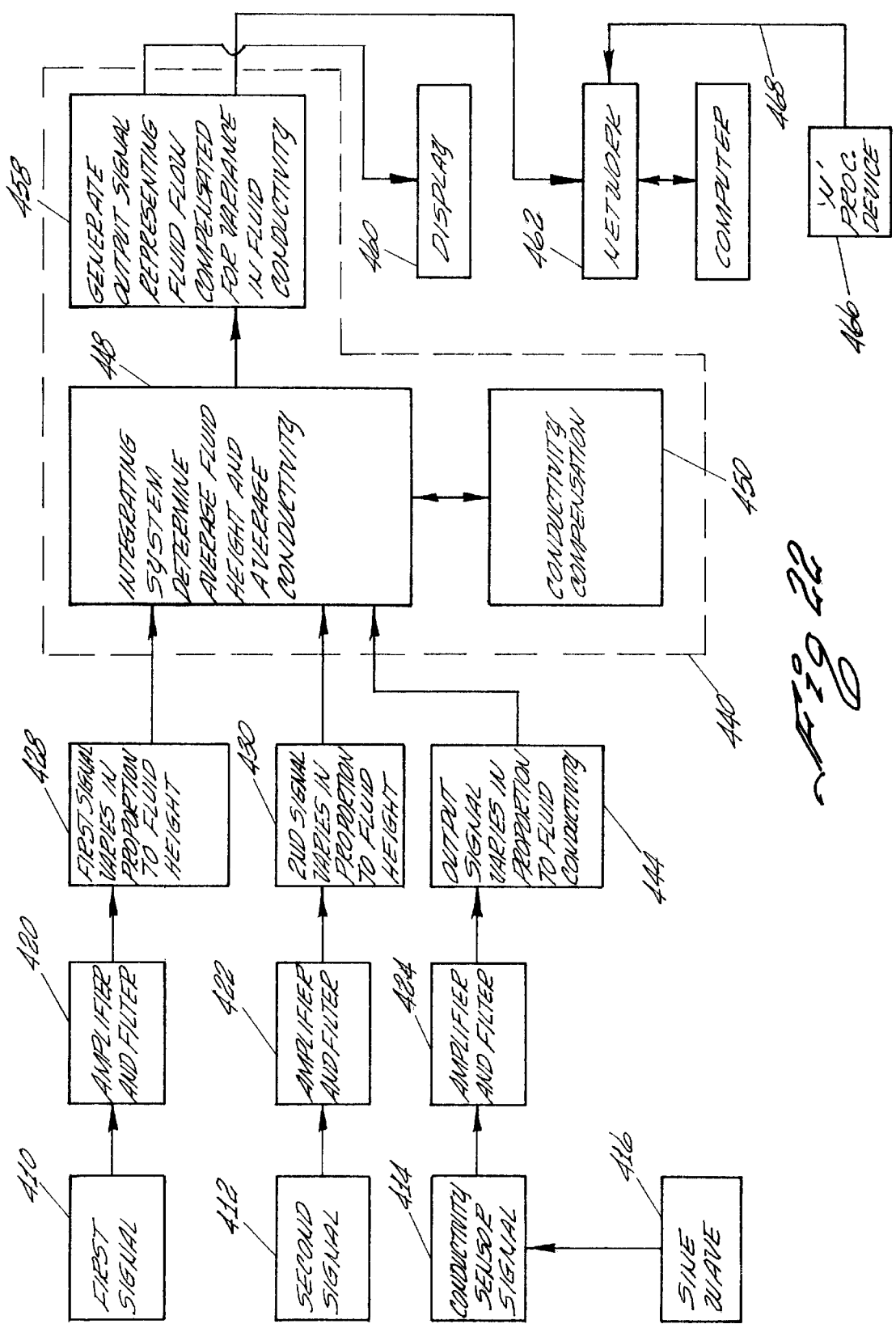
FIG. 22 is a schematic diagram of a milk flow meter having a first sensor, a second sensor, a conductivity sensor including electrical control and amplification stages and a processing device including an integrating system and display circuitry.

In the schematic diagram of FIG. 22, the milk flow meter has a structure similar to the structure illustrated in FIG. 7. The output signals from the first sensor is represented by box 410 and the output signals from the second sensor is represented by box 412. The output signals from the conductivity sensor is represented by box 414. As discussed hereinbefore the first sensor and the second sensor are sampled using sign waves as discussed above in connection with FIG. 7. In FIG. 22, the conductivity sensor 414 is sampled by a sign wave sampling circuit depicted by box 416. The outputs from elements 410, 412 and 414 are applied to amplifier and circuitry depicted by boxes 420, 422 and 424, respectively. The outputs from the amplifier and circuitry 420 and 422 vary in portion to fluid height as depicted boxes 428 and 430 respectively. The signals from elements 428 and 430 are applied to the processing device shown by dashed box 440.

The output from the amplifier and filter element 424 is an output signals which varies in proportion to fluid conductivity as illustrated by box 444. The output signals from the elements 428, 430 and 444 are applied to an integrating system 448 which forms part of the processing device 440. The integrating system 448 determines average fluid height and average conductivity.

A conductivity compensation device 450 is responsive to the output signals from element 448 to compensate the determination made by the integrating system 448 for variances due to conductivity of the fluid. The output from the integrating system 448 is applied to a signal generating circuit 458 which is used to generate an output signal representing fluid flow compensated for variance in fluid conductivity.

The output from the signal generating circuit 458 is applied to a display device 460 to display the relevant fluid flow data. Concurrently, the output from the signal generating circuit 458 is applied to a network processor 462 which is operatively connected to a computer 464. The network processor 462 may include inputs from other processing devices as represented by the box labeled "N" PROC. DEVICE and identified as element 456. Inputs from the "N" PROC. DEVICE 466 is applied to the network processor 462 by inputs 468. The above schematic diagram represents the process for calculating total value or weight of fluid which passes through the conduit of a continuous flow meter. The volume that passes through the conduit is calculated by the following equation:

$$V = S \times A \times T \tag{1}$$

wherein:

V=volume;

S=fluid speed (the desired variable being monitored)

A=cross section area of conduit filled by continuous fluid flow (determine using known sampling techniques) and T=sampling time window (sampling rate per second)

The flow rate of a continuous fluid flow is calculated using the following concept. A sinusoidal signal is applied to two sensors formed of electrode rings. The electric signal is sampled and passes through the continuous fluid flow in both sensors. Since the continuous fluid flow is conducted, e.g., milk is a conductive fluid flow, the continuous fluid acts as a resistor wherein the resistance thereof depends on the height of the fluid between the pair of electrodes forming the sensor. As a result the signal amplitude that is sensed during the sampling cycles will change as the height of the continuous fluid flow changes inside the conduit.

As such, when the continuous fluid passes through the conduit the sensors are sampled at a selected sample rate per second and the results of the electrical sampling process are plotted as wave forms as discussed in connection with FIG. 21 above.

Accordingly, in a milk flow meter the milk velocity= Distance between electrodes divided by the time delay or elapsed time.

An important criteria of the present invention is that the conduit will never be completely filled with the continuous fluid flow such that the vacuum will not be occluded during fluid processing. As a result the height of the fluid flow is moving up and down so that the waveforms depicted in FIG. 21 will never be flat.

Figure 23:
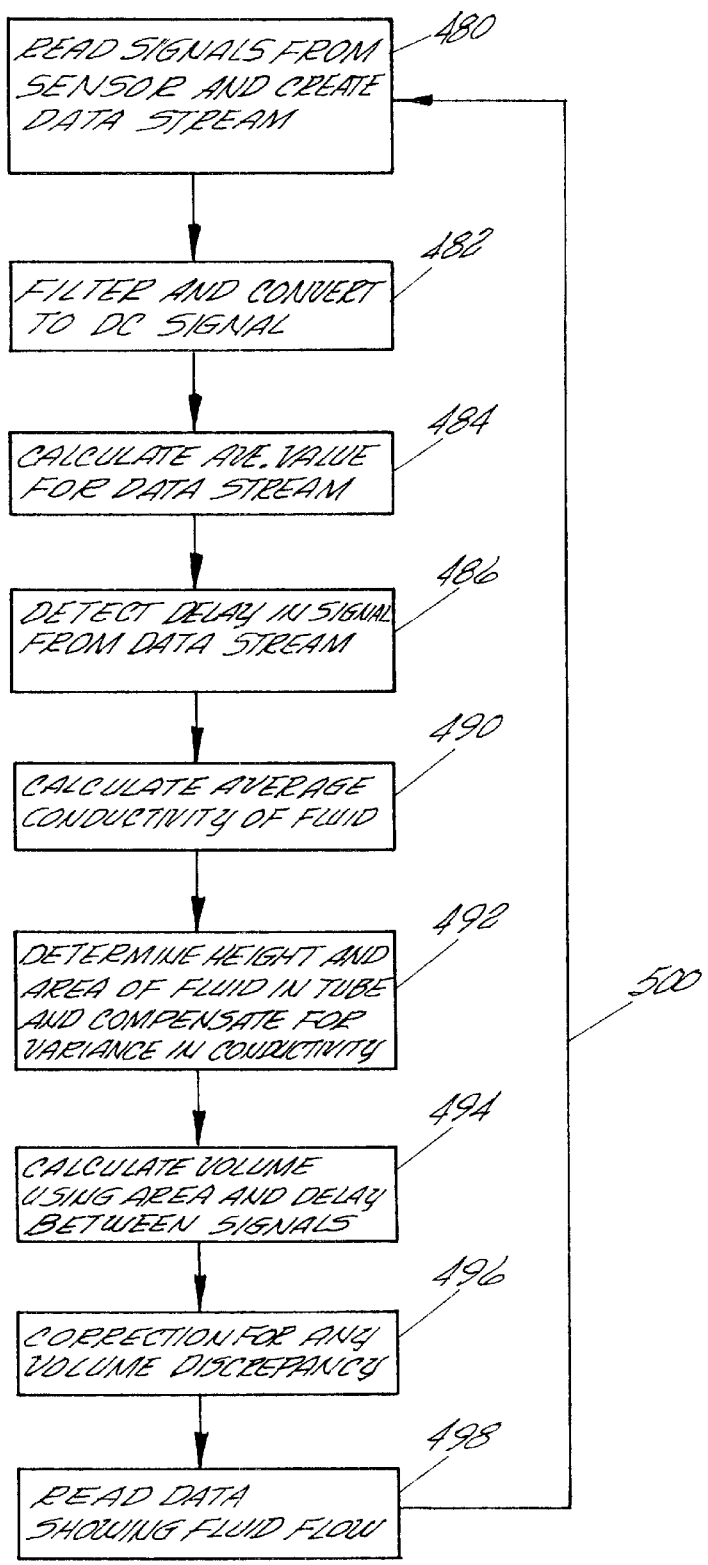
FIG. 23 is a flow chart of a method for measuring the flow rate of a continuous fluid flow.

FIG. 23 is a flow diagram of a method for measuring flow rate of a continuous fluid flow. The first step of the method includes reading signals from sensors and creating a data stream as shown by box 480. The signals from the sensors is applied to a filter and are converted to a DC signal as represented by box 482. The next step of the method is to calculate the average value for the data stream as depicted by box 44. The next step is the detecting of the delay in the signal from the data stream to calculate elapsed time of a "selected section" to traverse from the first predetermined location to the second predetermined location over the known distance and this step is depicted by box 486. The next step is the calculating of the average conductivity of the fluid based upon signals received from a conductivity sensor and this step is depicted by box 490. The next step is the determining of height and area of a "selected section" of fluid in the conduit and to compensate in variance in conductivity as depicted by box 492. Thereafter, next step is to calculate the volume of the fluid flow using the area of the "selected section" and the delay or elapsed time between signals and this step is depicted by box 494. If desired, correction can be made for any volume discrepancy as depicted by box 496. The next step is to read and display the data showing fluid flow as depicted by box 498. Upon display or storage of the data, the milk flow meter can be reset for a subsequent process and the reset is shown by lead line 500.

The teachings of the present invention in its broadest aspect covers a method for measuring flow rate of a continuous fluid flow. The method comprises steps of: (a) generating a first signal at a first predetermined location representing the height of a selected section of the continuous fluid flow at the first predetermined location and for generating a second signal at a second predetermined location located in a selected direction and a known distance from the first predetermined location representing that the selected section of the continuous fluid flow has traversed from the first predetermined location to the second predetermined location; (b) creating a data stream from the first signal and the second signal; (c) calculating from the data stream an elapsed time for the selected section of the continuous fluid flow to traverse the known distance; (d) deriving the cross-sectional area of the selected section from the height of the selected section compensated for variance in conductivity; (e) calculating the volume of fluid flow using the cross-sectional area and elapsed time; and (f) generating an output signal representing the calculated volume of fluid flow in the conduit.

The above method may further comprise the steps of: (a) generating a third signal representing the conductivity of the fluid; (b) creating a data stream from the first signal, the second signal and the third signal; (c) calculating from the data stream an average conductivity of the fluid; and (d) deriving the cross-sectional area of the selected section from the height of the selected section compensated for variance in conductivity.

The above method may further comprise the steps of: (a) transporting within a conduit in a selected direction the continuous fluid flow varying in height up to a maximum height wherein the maximum height is less than the height which would occlude the conduit.

The above method may further comprise the step of: (a) calculating from the data stream the average height of a plurality of the selected section of the continuous fluid flow at the first predetermined location.

The above method may further comprise the step of generating the first signal and the second signal includes the step of: (a) gating with a control signal the generation of the first signal and the second signal.

The above method may further comprise the step of generating the first signal and the second signal further comprises the step of: (a) gating and sampling on a periodic basis with a control signal the generation of the first signal and the second signal.

The preferred embodiment of the milking system disclosed herein using the teachings of the present invention is exemplary. It is understood that uses, variations, modifications and the like may be made and all such uses, variations, modifications and the like are anticipated to be within the scope of this invention.

What is claimed is:

1. A method for measuring flow rate of a continuous fluid flow comprising the steps of:
generating a first signal at a first predetermined location representing a height of a selected section of the continuous fluid flow having a known cross-sectional area at said first predetermined location and for generating a second signal at a second predetermined location located in a selected direction and a known distance from said first predetermined location representing that said selected section of the continuous fluid flow has traversed from said first predetermined location to said second predetermined location;
creating a data stream from said first signal and said second signal;
calculating from said data stream an elapsed time for the selected section of said continuous fluid flow to traverse said known distance;
deriving the cross-sectional area of said selected section and compensating the derived cross-sectional area for variance in conductivity;
calculating the volume of fluid flow using the cross-sectional area and elapsed time; and
generating an output signal representing the calculated volume of fluid flow.

2. The method of claim 1 further comprising the steps of:
generating a third signal representing the conductivity of the fluid;
creating a data stream from said first signal, said second signal and said third signal;
calculating from said data stream an average conductivity of the fluid; and
deriving the cross-sectional area of said selected section and compensating the derived cross-sectional area for variance in conductivity.

3. The method of claim 1 further comprising the step of transporting within a conduit in a selected direction the continuous fluid flow varying in height up to a maximum height wherein said maximum height is less than the height which would occlude said conduit.

4. The method of claim 1 further comprising the step of:
calculating from said data stream the average height of a plurality of said selected section of the continuous fluid flow at said first predetermined location.

5. The method of claim 1 wherein the step of generating said first signal and said second signal includes the step of
gating with a control signal the generation of said first signal and said second signal.

6. The method of claim 5 wherein the step of generating said first signal and said second signal includes the step of
gating and sampling on a periodic basis with a control signal the generation of said first signal and said second signal.

7. The method of claim 1 further comprising the step of compensating said output signal for variances in volume.

8. A method for measuring flow rate of a continuous milk flow in a conduit comprising:
transporting within the conduit in a selected direction the continuous milk flow varying in height up to a maximum height wherein said maximum height is less than the height which would occlude said conduit and wherein said milk flow has a known cross-sectional area;
generating with a first detector a first signal at a first predetermined location representing a height of a selected section of the continuous milk flow at said first predetermined location and for generating with a second detector a second signal at a second predetermined location located in a selected direction and a known distance representing that said selected section of the continuous milk flow has traversed from said first predetermined location to said second predetermined location;
generating a third signal representing the conductivity of the milk forming said continuous milk flow;
creating a data stream from said first signal, said second signal and said third signal;
calculating from said data stream the average height of said selected section of the continuous milk flow at said first predetermined location;
calculating from said data stream an elapsed time for the selected section of said continuous milk flow to traverse said known distance;
calculating from said data stream an average conductivity of the milk from the data stream;
deriving the cross-sectional area of said selected section and compensating the derived cross-sectional area for variance in conductivity;
calculating the volume of milk flow using the cross-sectional area and elapsed time; and
generating an output signal representing the calculated volume of milk flow in said conduit.

9. The method of claim 8 wherein said step of generating with a detector further includes using a detector having a first detection section for determining at said first predetermined location the height of a said selected section of the continuous milk flow and a second detection section for determining the height of said selected section of the continuous milk flow at said second predetermined location.

10. The method of claim 8 wherein said step of detecting includes using a detector having a first detection section and said second detection section located within said conduit, said first detection section comprising a first sensor having a predetermined cross-sectional area defining an opening for passing a selected section of fluid flow therethrough wherein said predetermined cross-sectional area is greater than the cross-sectional area of said milk flow passing therethrough and said second detection section comprising a second sensor having a cross-sectional area substantially equal to the cross-sectional area of the first sensor and being positioned relative to said conduit and said first sensor for determining the height of a said selected section of the continuous milk flow at said second predetermined location.

11. The method of claim 8 wherein the step of generating uses a sine wave for sampling signals generated by the detector.

12. The method of claim 8 wherein the steps of calculating and deriving include the use of a processing device operatively for deriving the cross-sectional area of said selected section of the continuous fluid from the height of a selected section at said first predetermined location, for determining an elapsed time for the selected section of said continuous fluid flow to traverse said known distance and for calculating therefrom the fluid flow of a continuous fluid flow through said conduit.

13. A method for measuring flow rate of a continuous fluid flow comprising
sampling on a periodic basis and generating a plurality of first signals at a first predetermined location representing heights of a plurality of selected sections of the continuous fluid flow having a known cross-sectional area at said first predetermined location and for generating a plurality of second signals at a second predetermined location located in a selected direction and a known distance from said first predetermined location representing that each of said plurality of selected sections of the continuous fluid flow has traversed from said first predetermined location to said second predetermined location;

generating a third signal representing the conductivity of the fluid;

receiving said first signal, said second signal and said third signal and creating a data stream therefrom;

calculating from said data stream an elapsed time for the selected section of said continuous fluid flow to traverse said known distance;

calculating from said data stream an average conductivity of the fluid from the data stream;

deriving the cross-sectional area of said selected section from said height of the selected section and compensating the derived cross-sectional area for variance in conductivity;

calculating the volume of fluid flow using the cross-sectional area and elapsed time; and generating an output signal representing the calculated volume of fluid flow in said conduit.

14. The method of claim 13 further comprising the step of calculating from said data stream the average height of each of said selected sections of the continuous fluid flow at said first predetermined location.

15. The method of claim 13 further comprising the step of transporting within a conduit in a selected direction the continuous fluid flow varying in height up to a maximum height wherein said maximum height is less than the height which would occlude said conduit.

16. The method of claim 13 wherein said step of generating with a detector further includes using a detector having a first detection section for determining at said first predetermined location the height of a said selected section of the continuous milk flow and a second detection section for determining the height of said selected section of the continuous fluid flow at said second predetermined location.

17. The method of claim 16 wherein said step of detecting includes using a detector having a first detection section and said second detection section located within said conduit, said first detection section comprising a first sensor having a predetermined cross-sectional area defining an opening for passing a selected section of fluid flow therethrough wherein said predetermined cross-sectional area is greater than the cross-sectional area of said fluid flow passing therethrough and said second detection section comprising a second sensor having a cross-sectional area substantially equal to the cross-sectional area of the first sensor and being positioned relative to said conduit and said first sensor for determining the height of a said selected section of the continuous fluid flow at said second predetermined location.

18. The method of claim 16 wherein the steps of calculating and deriving use a processing device operatively connected to said first detector section and said second detector section for deriving the cross-sectional area of said selected section of the continuous fluid flow from the height of a selected section at said first predetermined location, for determining an elapsed time for the selected section of said continuous fluid flow to traverse said known distance and for calculating therefrom the fluid flow of a continuous fluid flow through said conduit.

19. The method of claim 16 wherein the steps of calculating and deriving uses a processing device including an integrating device for determining the average height of a plurality of selected sections of said continuous fluid flow and average conductivity of said fluid flow;

a conductivity compensating device operatively connected to said integrating device for determining variances in conductivity of the electrically conductive fluid forming the fluid flow; and a generator responsive to the integrating device for generating an output signal representing the fluid flow compensated for variances in conductivity.

20. The method of claim 16 wherein the steps of calculating and deriving use a processing device operatively connected to said first detector section and said second detector section wherein said first detection section and said second detection section are located within said conduit, said first detection section comprising a first sensor having a predetermined cross-sectional area defining an opening for passing said fluid flow therethrough wherein said predetermined cross-sectional area is greater than the cross-sectional area of said fluid flow passing therethrough and wherein said second detection section comprises a second sensor having a cross-sectional area substantially equal to the cross-sectional area of the first sensor.

21. The method of claim 13 further comprising the step of compensating said output signal for variances in volume.

22. The method of claim 13 wherein the steps of calculating and deriving use a processing device having said first sensor formed of pair of spaced, coaxially aligned rings.

23. The method of claim 22 wherein the steps of calculating and deriving use a processing device having said second sensor formed of pair of spaced, coaxially aligned rings.

* * * * *